United States Patent
Shapiro et al.

(10) Patent No.: US 11,877,159 B2
(45) Date of Patent: Jan. 16, 2024

(54) COMPUTING SYSTEM THAT IS CONFIGURED TO ASSIGN WIRELESS BEACONS TO POSITIONS WITHIN A BUILDING

(71) Applicant: Microsoft Technology Licensing, LLC, Redmond, WA (US)

(72) Inventors: Simon Levi Shapiro, Bellevue, WA (US); Chiqun Zhang, Sunnyvale, CA (US); Dragomir Dimitrov Yankov, Sunnyvale, CA (US); Wei Wu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 16/903,313

(22) Filed: Jun. 16, 2020

(65) Prior Publication Data
US 2021/0392513 A1    Dec. 16, 2021

(51) Int. Cl.
*H04W 16/20* (2009.01)
*H04W 4/02* (2018.01)
*H04W 4/33* (2018.01)
*H04W 24/02* (2009.01)

(52) U.S. Cl.
CPC .......... *H04W 16/20* (2013.01); *H04W 4/023* (2013.01); *H04W 4/33* (2018.02); *H04W 24/02* (2013.01)

(58) Field of Classification Search
CPC ....... H04W 16/20; H04W 4/33; H04W 4/023; H04W 24/02; H04W 16/22; H04W 4/02; H04W 4/64
See application file for complete search history.

(56) References Cited

U.S. PATENT DOCUMENTS

| | | | | |
|---|---|---|---|---|
| 10,623,902 B2 * | 4/2020 | Deora | ............... | H04W 52/245 |
| 10,830,592 B2 * | 11/2020 | Koshy | ............... | H04W 4/024 |
| 10,986,509 B1 * | 4/2021 | Lois | ............... | H04W 16/22 |
| 11,421,993 B2 * | 8/2022 | Yu | ............... | G01C 21/206 |
| 11,494,973 B2 * | 11/2022 | Boyadzhiev | ......... | G01C 21/206 |
| 2006/0262731 A1 * | 11/2006 | Carlson | ............... | H04W 16/18 370/252 |
| 2015/0296388 A1 * | 10/2015 | Bassiri | ............... | H04W 24/10 455/446 |

(Continued)

OTHER PUBLICATIONS

Falque, et al., "Optimizing Placement and Number of RF Beacons to Achieve Better Indoor Localization", In the Proceedings of IEEE International Conference on Robotics and Automation, May 21, 2018, pp. 2304-2311.

(Continued)

*Primary Examiner* — Khawar Iqbal
(74) *Attorney, Agent, or Firm* — Calfee, Halter & Griswold LLP

(57) ABSTRACT

Described herein are technologies relating to assigning wireless beacons to positions within a building, wherein the wireless beacons are included in an indoor positioning system. A computer-implemented floorplan representation is generated, wherein the representation includes a layout of the building and materials of structures of the building. Coverages of wireless beacons are simulated, and multiple objectives are balanced to identify a number of wireless beacons to deploy in the building and positions in the building where the wireless beacons are to be deployed.

20 Claims, 15 Drawing Sheets

(56) References Cited

U.S. PATENT DOCUMENTS

| | | | | |
|---|---|---|---|---|
| 2015/0312774 | A1* | 10/2015 | Lau | G05D 1/102 |
| | | | | 455/446 |
| 2016/0119347 | A1* | 4/2016 | Liu | H04W 36/14 |
| | | | | 370/331 |
| 2017/0245116 | A1* | 8/2017 | Chu | H04W 4/029 |
| 2018/0199161 | A1* | 7/2018 | Deora | H04W 4/02 |
| 2018/0234939 | A1* | 8/2018 | Pattabiraman | H04B 7/0452 |
| 2018/0317095 | A1* | 11/2018 | Rumler | H04W 24/10 |
| 2019/0072395 | A1* | 3/2019 | Namboodiri | G06F 30/18 |
| 2019/0132217 | A1* | 5/2019 | Kalika | H04L 41/12 |
| 2019/0306724 | A1* | 10/2019 | Guenot-Falque | H04W 16/20 |
| 2019/0313318 | A1* | 10/2019 | Pawar | H04M 15/62 |
| 2020/0100063 | A1* | 3/2020 | Jadav | H04L 43/0805 |
| 2020/0107161 | A1* | 4/2020 | Pan | H04W 4/024 |
| 2020/0145837 | A1* | 5/2020 | Tran | H04W 16/20 |
| 2020/0196093 | A1* | 6/2020 | Wendt | H04W 4/023 |
| 2020/0302480 | A1* | 9/2020 | Busch | G06Q 30/0245 |
| 2020/0311468 | A1* | 10/2020 | Kim | G06N 3/08 |
| 2020/0400774 | A1* | 12/2020 | Luomi | G01C 21/206 |
| 2021/0021971 | A1* | 1/2021 | Mesirow | H04W 4/02 |
| 2021/0073449 | A1* | 3/2021 | Segev | G06F 30/27 |
| 2022/0065973 | A1* | 3/2022 | Cho | G01S 5/02524 |
| 2023/0153485 | A1* | 5/2023 | Austern | G06N 20/00 |
| | | | | 703/1 |

OTHER PUBLICATIONS

"International Search Report and Written Opinion Issued in PCT Application No. PCT/US21/029261", dated Aug. 23, 2021, 11 Pages.

* cited by examiner

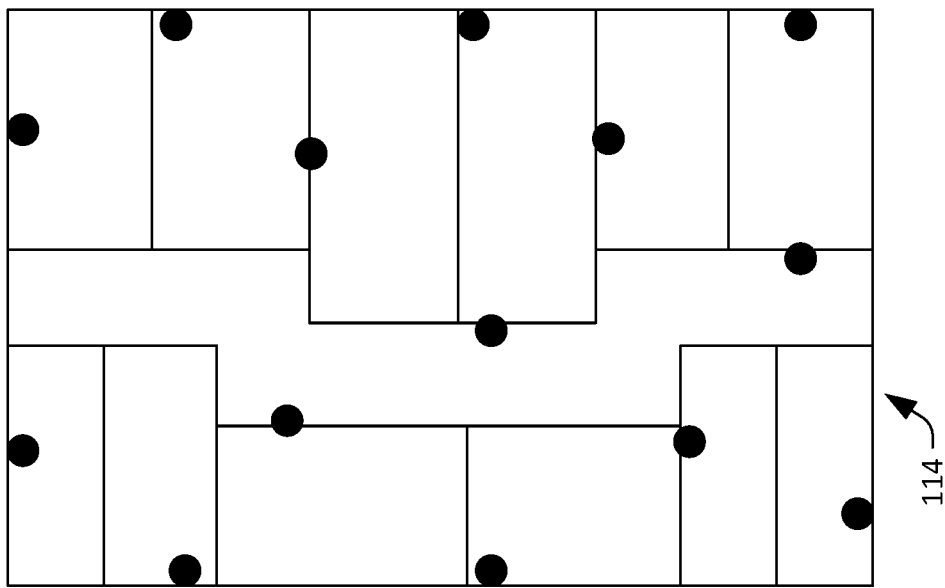
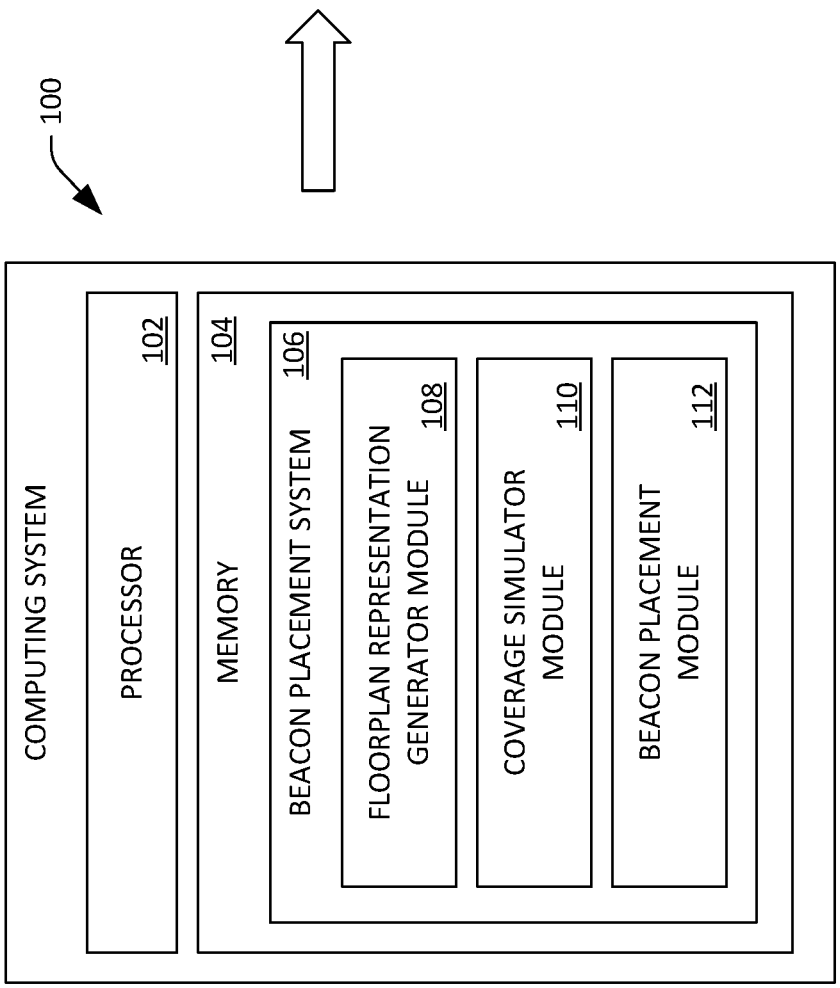
FIG. 1

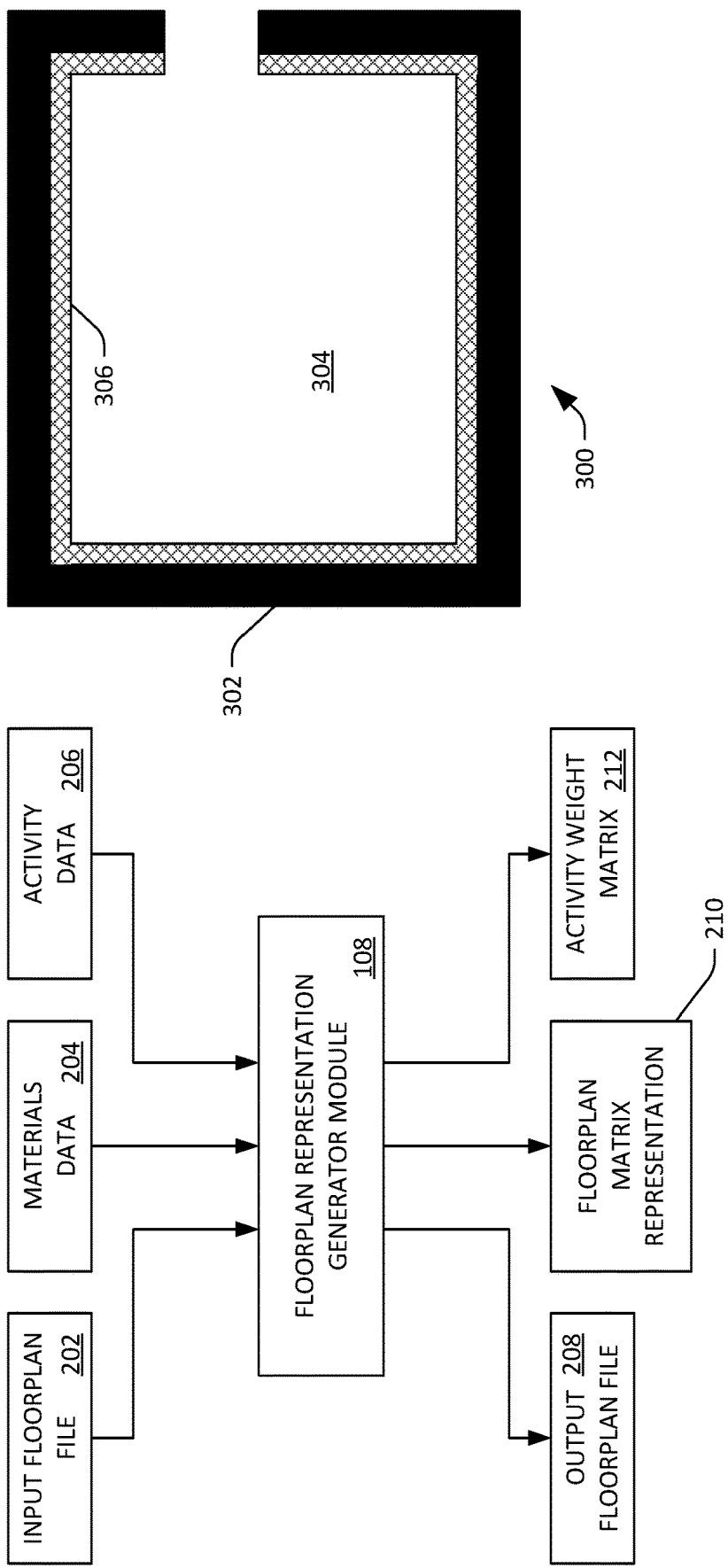

COMPUTING SYSTEM THAT IS CONFIGURED TO ASSIGN WIRELESS BEACONS TO POSITIONS WITHIN A BUILDING

BACKGROUND

Global Positioning System (GPS) technologies are widely employed to provide localization services, wherein such services are used by computer-implemented navigation applications, location-based recommendation applications, search engines that are configured to provide location-based search results, and so forth. In an example, a smart phone that includes a GPS receiver is typically able to compute its location with an accuracy that is within a 4.9 meter radius under open sky. GPS technologies, however, are ill-equipped to provide localization services when a device to be localized is indoors; this is because building structures (e.g., roofs, walls, etc.), nearby trees, etc. attenuate GPS signals, and therefore a GPS receiver that is located indoors is often unable to obtain three GPS signals needed to compute a location.

In addition, indoor localization services tend to need to provide higher precision than can be offered by GPS technologies, as incorrectly computing a location of a device by a relatively small distance can cause the device to be ascertained in an incorrect portion of a building (e.g., an incorrect room). To provide indoor localization services, wireless beacons that transmit wireless signals can be positioned throughout a building and a device can compute its location (using triangulation) based upon at least three wireless signals emitted by at least three wireless beacons that are at known locations. For instance, Bluetooth low energy (BLE) beacons have been used in connection with providing indoor localization services. Accuracy of a BLE-based indoor positioning system depends upon multiple factors, including technology of the wireless beacons, layout of a building within which the wireless beacons are placed, materials in the building, a computer-implemented algorithm that computes locations, technologies of devices that are to be localized, and placement of wireless beacons throughout the building.

With respect to placement of wireless beacons throughout a building, conventionally, an entity that wishes to have an indoor positioning system installed in a building provides a number of wireless beacons that are to be positioned in the building. Thereafter, a grid is overlaid on a floorplan of the building, and the wireless beacons are assigned to locations within the building based upon such grid. Thus, wireless beacons are typically uniformly spread throughout the building. Uniformly spreading wireless beacons throughout a building, however, can lead to sub-optimal positioning of wireless beacons for purposes of indoor localization and can lead to use of too many (or too few) wireless beacons for indoor localization purposes.

SUMMARY

The following is a brief summary of subject matter that is described in greater detail herein. This summary is not intended to be limiting as to the scope of the claims.

Described herein are various technologies pertaining to indoor localization, wherein a device (such as a mobile telephone, a tablet computing device, a wearable computing device, etc.) can be localized based upon wireless signals emitted by wireless beacons positioned within a building. With more particularity, computer-implemented technologies that are configured to output locations within a building where wireless beacons are to be positioned are described herein, wherein the wireless beacons are included in an indoor positioning system.

As will be described in greater detail below, a computer-implemented floorplan representation of a building can be constructed, wherein the computer-implemented floorplan representation: 1) indicates physical layout (e.g., in two dimensions or three dimensions) of the building, materials of structures in the building (e.g., walls, floors, doors, large pieces of furniture); 2) identifies positions within the building where wireless beacons can be deployed (e.g., it is not possible to place a wireless beacon within a wall); and 3) includes data that indicates importance of different locations within the buildings (e.g., amounts of human traffic at different locations within the building). In an exemplary embodiment, the computer-implemented floorplan representation can include: 1) a matrix that represents physical layout of the building; 2) an activity weight matrix that represents volumes of foot traffic at different locations within the building; 3) and a computer-implemented file that is provided as input to a software module that is configured to simulate coverages of wireless signals emitted by wireless beacons within the building, wherein the computer-implemented file identifies materials within the building.

With respect to the computer-implemented file that is provided as input to the software module that is configured to simulate coverages of wireless signals emitted by wireless beacons, initially, wireless beacons can be randomly or pseudo-randomly assigned to positions within the building by way of the computer-implemented file. Coverages of wireless signals emitted by the wireless beacons when placed at such proposed positions are simulated based upon physical layout of the building and materials included in the building as represented in the computer-implemented file. The simulated coverages are provided to a computer-implemented optimization module, which in an example executes a multi-objectives loss function to compute a value for loss with respect to the proposed positions of the wireless beacons within the building. In an exemplary embodiment, the optimization module can consider the following objectives when computing the value for loss: 1) coverages of wireless signals emitted by the wireless beacons as output by the simulation software module; 2) a cost assigned to wireless beacons (e.g., the more wireless beacons that are deployed in the building the more costly the installation of the indoor positioning system); and 3) a distribution loss, wherein distribution loss increases as distances between wireless beacons decrease.

Subsequent to the value for loss being computed for the proposed positions of the wireless beacons, the proposed positions can be updated in the computer-implemented file. In an exemplary embodiment, an evolutionary algorithm can be employed to update positions of wireless beacons in the computer-implemented file. Coverages of wireless signals emitted by the wireless beacons can again be simulated based upon the proposed (updated) positions of the wireless beacons, and such simulated coverages can be provided as input to the optimization module referenced above. The optimization module computes a second value for loss based upon the objectives referenced above. The process of updating positions (and numbers) of wireless beacons, simulating coverages, and computing values for loss iterates until the value for loss is deemed acceptable. In an example, the value for loss can be deemed as acceptable when: a) an approximate minimum of the value for loss is identified; or b) a delta between consecutively computed values for loss is less than some threshold. When the value for loss is deemed to be acceptable, an identification of positions of wireless beacons (that correspond to the acceptable value for loss) can be output, and an installer can install the wireless beacons at such positions. This results in improved positioning of wireless beacons (potentially at reduced monetary cost) when compared to positioning wireless beacons using the conventional approach of uniformly distributing wireless beacons in the building.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 1 is a functional block diagram of an exemplary computing system that is configured to output positions where wireless beacons are to be installed within a building.

FIG. 2 is a functional block diagram of an exemplary module that is configured to generate a computer-implemented representation of a building layout.

FIG. 3 is a schematic that depicts a portion of a building layout represented by a computer-implemented floorplan representation.

DETAILED DESCRIPTION

Figure 4:
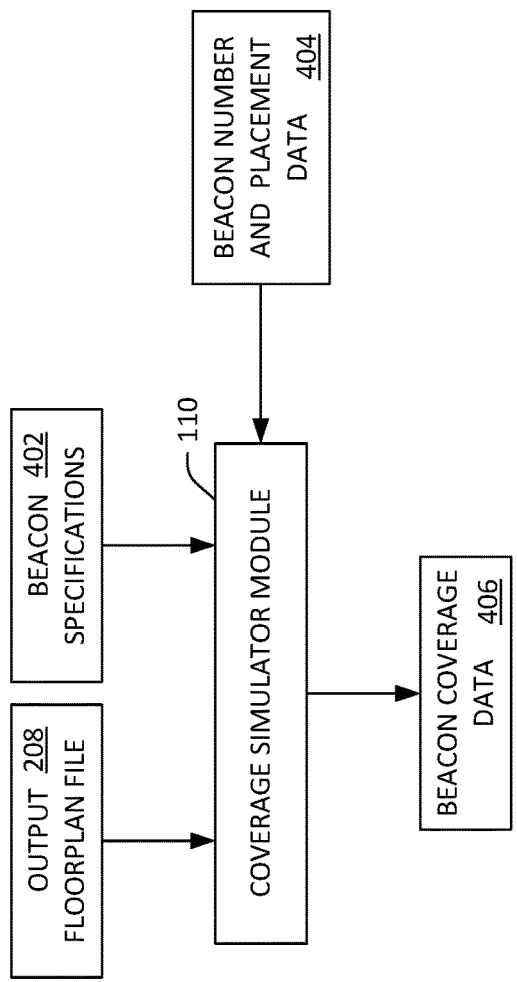
FIG. 4 is a functional block diagram of an exemplary coverage simulator module that is configured to simulate coverage of wireless beacons.

Various technologies pertaining to assigning wireless beacons to positions within a building (where the wireless beacons are to be deployed in an indoor positioning system) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining to identifying positions within a building where wireless beacons are to be installed, wherein the wireless beacons are included in an indoor positioning system that is employed to localize mobile devices within the building. The wireless beacons are configured to emit wireless signals according to any suitable wireless protocol, including but not limited to Wi-Fi, Bluetooth low energy (BLE), Bluetooth, WiMAX, etc. The technologies described herein differ from conventional technologies in that materials included in the building are considered when simulating coverages of wireless signals emitted in the building by wireless beacons. The technologies described herein further differ from conventional technologies by considering multiple objectives when identifying positions within the building where wireless beacons are to be deployed. Such multiple (and competing) objectives include: 1) coverage (e.g., it is desirable that locations within the building are covered by at least three wireless signals emitted by at least three wireless beacons);

2) cost (e.g., it is desirable to provide wireless coverage using as few wireless beacons as possible); and 3) distribution (e.g., for purposes of indoor localization, it is desired that wireless beacons be spaced as far apart from one another as possible). The technologies described herein identify positions where wireless beacons are to be deployed within the building based upon these multiple objectives (by identifying an appropriate balance between coverage, cost, and distribution). In summary, then, the technologies described herein balance wireless beacon coverage, cost, and distribution to identify positions within a building where wireless beacons are to be installed for purposes of indoor localization.

With reference now to FIG. 1, a functional block diagram of an exemplary computing system 100 that is configured to identify positions within a building where wireless beacons are to be deployed is illustrated. The computing system 100 includes a processor 102 and memory 104, wherein the memory 104 includes a beacon placement system 106 that is executed by the processor 102. Summarily, the beacon placement system 106 is configured to perform the following actions: 1) generate a computer-implemented representation of a floorplan of a building within which wireless beacons are to be installed and deployed (wherein the representation can include a two-dimensional representation of the floorplan or a three-dimensional representation of the floorplan), and further wherein the floorplan representation is generated based upon: a) an input floorplan file (e.g., in GeoJSON format); b) materials of structures of the building, such as walls, doors, windows, etc.; and c) "importance" of different locations in the building, wherein importance, in an example, may be an amount of human traffic that passes through different areas over a window of time; 2) based upon the floorplan representation, simulate coverage of wireless signals emitted by wireless beacons when the wireless beacons are positioned at proposed positions in the building; and 3) compute values for loss when the different numbers of wireless beacons are placed at different proposed positions. The beacon placement system 106 can then identify a number of wireless beacons and positions in the building where the identified number of wireless beacons are to be installed and deployed based upon the computed values for loss.

Now with more specificity, the beacon placement system 106 includes a floorplan representation generator module 108, a coverage simulator module 110, and a beacon placement module 112, wherein such modules perform actions that are described in detail below. Output of the beacon placement system 106 includes a number of wireless beacons and positions within a building where the wireless beacons (used in an indoor positioning system) are to be installed and deployed. For example, the beacon placement system 106 can output an exemplary layout 114 of the building, where the layout 114 identifies boundaries of rooms and hallways within the building and further identifies positions within the building where wireless beacons are to be installed (where black dots in the layout 114 represent the positions of the wireless beacons). While illustrated as being two-dimensional, it is to be understood that the layout 114 may be three-dimensional, such that the layout 114 depicts in three dimensions where wireless beacons are to be installed in the building. An installer can use the layout 114 to install wireless beacons in the building at positions identified by the beacon placement system 106 in the layout 114.

Referring now to FIG. 2, a functional block diagram depicting operation of the floorplan representation generator module 108 is illustrated. The floorplan representation generator module 108 is configured to receive an input floorplan file 202, materials data 204, and activity data 206. Based upon the input floorplan file 202, the materials data 204, and the activity data 206, the floorplan representation generator module 108 is configured to output an output floorplan file 208, a floorplan matrix representation 210, and an activity weight matrix 212 (where a computer-implemented floorplan representation can include at least one of the output floorplan file 208, the floorplan matrix representation 210, and the activity weight matrix 212). The inputs and outputs of the floorplan representation generator module 108 are discussed in detail below.

The input floorplan file 202 is a computer-implemented file that has a format that allows for expression of polygons and vertices to represent rooms, walls, and corners in a building. In an exemplary embodiment, the input floorplan file 202 is a GeoJSON file, where GeoJSON is a file format that includes indoor layout information expressed as polygons and vertices (such as those depicted in the layout 114 illustrated in FIG. 1). Therefore, the input floorplan file 202 can include latitude, longitude, and height values that define where room boundaries are located. The materials data 204 can define types of materials for elements represented in the input floorplan file 202. Exemplary types of materials can include drywall, concrete, wood (including different types of wood), carpet, tile, etc., wherein different types of materials have different properties with respect to attenuating wireless signals emitted by wireless beacons. The activity data 206 can include data that is indicative of importance of different locations within the building. For instance, the activity data 206 can indicate that a first room in the building frequently has a relatively large number of people therein while the activity data 206 may indicate that a second room typically has a relatively small number of people therein.

The floorplan representation generator module 108 receives the input floorplan file 202, loops through each polygon represented in the input floorplan file 202, identifies vertexes represented in the input floorplan file 202, and generates representations of corners and partitions in the building. The floorplan representation generator module 108 generates the output floorplan file 208 by conflating the corners, partitions, and the material properties 204. The output floorplan file 208 may be formatted such that the output floorplan file 208 can be consumed by an existing signal attenuation simulation module, such as that described in Amiot, et al., "PyLayers: An Open Source Dynamic Simulator for Indoor Propagation and Localization", In 2013 IEEE International Conference on Communications Workshops (ICC), IEEE, pages 84-88, 2013.

The floorplan representation generator module 108 can additionally calculate the width (W) and length (L) of the building (in meters) as follows:

$$W = \Delta_{long} \times 4.0075 \times 1e7 \times \cos(\text{lat})/360$$

$$L = \Delta_{lat} \times 1.1132 \times 1e5, \tag{1}$$

where $\Delta_{long}$ and $\Delta_{lat}$ are the absolute differences between maximum and minimum of longitude and latitude, respectively, as expressed in the input floorplan file 202. For example, if a building were located at (37.4044, 122.0350) with $\Delta_{lat}=0.0012$ and $\Delta_{long}=0.0008$, the floorplan representation generator module 108 calculates W as 88 meters and L as 133 meters.

In addition, the floorplan representation generator module 108 can generate an image of the layout of the building as represented in the input floorplan file 202 based on partitions constructed by the floorplan representation generator module 108, where a first color (e.g., black) in the image represents partitions and where a second color (e.g., white) in the image represents open space. The floorplan representation generator module 108 can crop the image tightly so that there is little to no whitespace margin. Further, with respect to the generated image, the floorplan representation generator module 108 defines a resolution scale S that represents how many meters each pixel in the image represents; based upon such resolution scale S, the floorplan representation generator module 108 can resize the image to $$\left(\frac{W}{S}, \frac{L}{S}\right).$$

The floorplan representation generator module 108 can pad white margin to the image to account for facet walls, and can transform the resized image into a matrix M, where elements of M can be either zero (e.g., black representing a partition) or 255 (e.g., white representing open space). The floorplan representation generator module 108 then maps each element m in M into one of three categories: 0 as block; 1 as accessible; and 2 as deployable. "Block" is assigned to black elements that represent walls or partitions where people cannot obtain access, and thus represent locations within the building where wireless beacons cannot be deployed. "Accessible" is assigned to white elements in the matrix M that represent rooms and corridors (e.g., open spaces that can be accessed by people but where wireless beacons will not be deployed). "Deployable" is assigned to elements in matrix M that represent locations in the building wireless beacons can be deployed. For example, typically, surfaces of walls are "deployable" while insides of walls are "block" (and not deployable). In yet another example, a person is unable to reach a location in a building represented by an element that is surrounded by "block" elements, and therefore the floorplan representation generator 108 can label the element as "block". The floorplan representation generator module 108 outputs the floorplan matrix representation 210 (R), where such representation 210 is the matrix M with each element having one of the three aforementioned categories assigned thereto.

The floorplan representation generator module 108 can generate the activity weight matrix 212 by assigning weights to elements (e.g., white elements) in the matrix M that have been identified as representing a room or corridor. Thus, a weight assigned to an element m in the activity weight matrix 212 may indicate an amount of human traffic at the location in the building represented by the element m over some window of time, may represent areas where precise localization is required, etc.

FIG. 3 is a schematic that illustrates a graphical representation 300 of a portion of the floorplan matrix representation 210. The representation 300 includes a region 302 identified as "block" in the floorplan matrix representation 210 (depicted in solid black), a region 304 identified as "accessible" in the floorplan matrix representation 210 (depicted in solid white), and a region 306 identified as "deployable" in the floorplan matrix representation 210 (depicted in hash). The region 306 identified as "deployable" represents positions within the building where wireless beacons can be installed (e.g., affixed to walls and/or ceilings).

With reference now to FIG. 4, a functional block diagram depicting exemplary operation of the coverage simulator module 110 is illustrated. The coverage simulator module 110 receives the output floorplan file 208 generated by the floorplan representation generator module 108. In addition, the coverage simulator module 110 receives beacon specifications 402, wherein the beacon specifications 402 can include, for each wireless beacon whose coverage is to be simulated, a name of the wireless beacon, a protocol of wireless signals emitted by the wireless beacon, power of wireless signals emitted by the wireless beacon, and a channel over which the wireless beacon is to emit wireless signals.

In addition, the coverage simulator module 110 can receive beacon number and placement data 404, wherein the beacon number and placement data 404 includes an indication of a number of wireless beacons that are to be simulated as well as proposed positions within the building where the number of wireless beacons are located for purposes of simulation. The coverage simulator module 110, based upon: 1) the output floorplan file 208 (which includes materials in the building); 2) the beacon specifications 402; and 3) the beacon number and placement data 404, outputs beacon coverage data 406, wherein the beacon coverage data 406 identifies coverages of wireless signals emitted by the wireless beacons when the wireless beacons are positioned at the proposed positions (as identified in the beacon number and placement data 404).

With additional detail with respect to the coverage simulator module 110, there are three commonly used models for estimating wireless signal propagation, wherein such models include the Disk model, the Friis model, and the Direct Line of Sight model. The Disk model assumes that signal strength is constant within a radius and zero outside of such radius. The Friis model assumes that signal strength decays at a rate related to distance squared. Neither the Disk model nor the Friis model considers signal attenuation caused by walls or other features commonly found in buildings. The Direct Line of Sight model treats signal strength as light rays; thus, the Direct Line of Sight model assumes that walls completely block signals emitted by wireless beacons. Although such models may serve as suitable approximations for signal propagation in outdoor environments, these models fail to provide a suitable approximation of signal propagation in an indoor environment. Accordingly, the coverage simulator module 110 can consider signal attenuation caused by walls, doors, and other features commonly found in buildings when generating estimates of coverage of wireless signals emitted by wireless beacons.

To consider impact of the effects of the surroundings of a wireless beacon on signal propagation, the coverage simulator module 110 can be or include the simulator described in Amiot, et al., "PyLayers: An Open Source Dynamic Simulator for Indoor Propagation and Localization", In 2013 IEEE International Conference on Communications Workshops (ICC), IEEE, pages 84-88, 2013, wherein such simulator provides realistic site-specific signal propagation simulation through use of a graph-based ray tracing method. It is to be understood, however, that any suitable coverage simulator that takes building structure and materials into consideration when simulating signal coverage can be employed.

Figure 5:
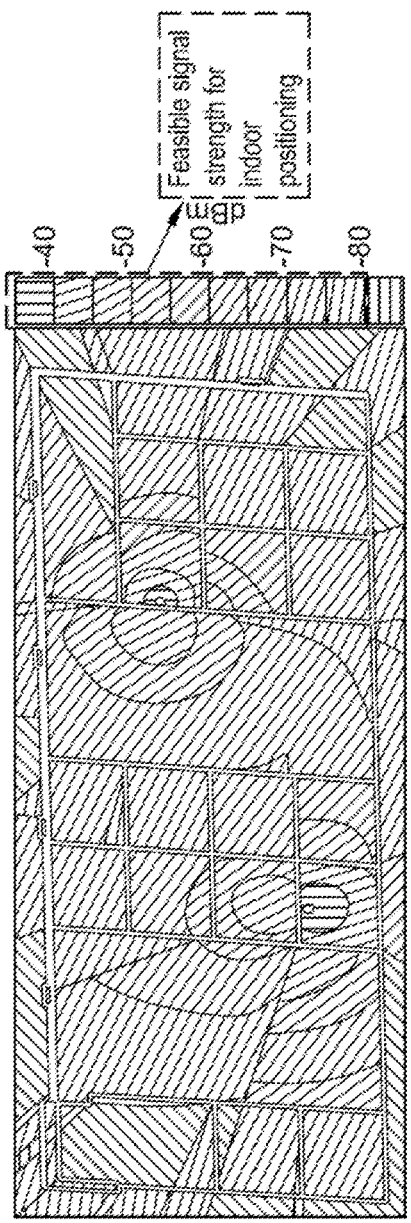
FIG. 5 is an illustration of an exemplary output of the coverage simulator module.

Referring to FIG. 5, exemplary output of the coverage simulator module 110 with respect to an exemplary building layout is depicted. The signal coverage represented in FIG. 5 illustrates that wireless signals are attenuated by features found in buildings that have different materials such as walls, doors, and the like.

Returning to FIG. 4, the coverage simulator module 110, in an exemplary embodiment, can assume that maximum feasible distance between a receiver (e.g., a mobile device) and a wireless beacon for indoor localization is some threshold radius (e.g., 8 meters when the wireless beacon emits BLE signals). Therefore, the coverage simulator module 110 may not consider signal attenuation outside of the threshold radius, thereby allowing the coverage simulator module 110 to execute a simulation much faster than would be possible if the coverage simulator module 110 were to perform simulations with the assumption that the receiver can be at any location within the building relative to the wireless beacon.

Figure 6:
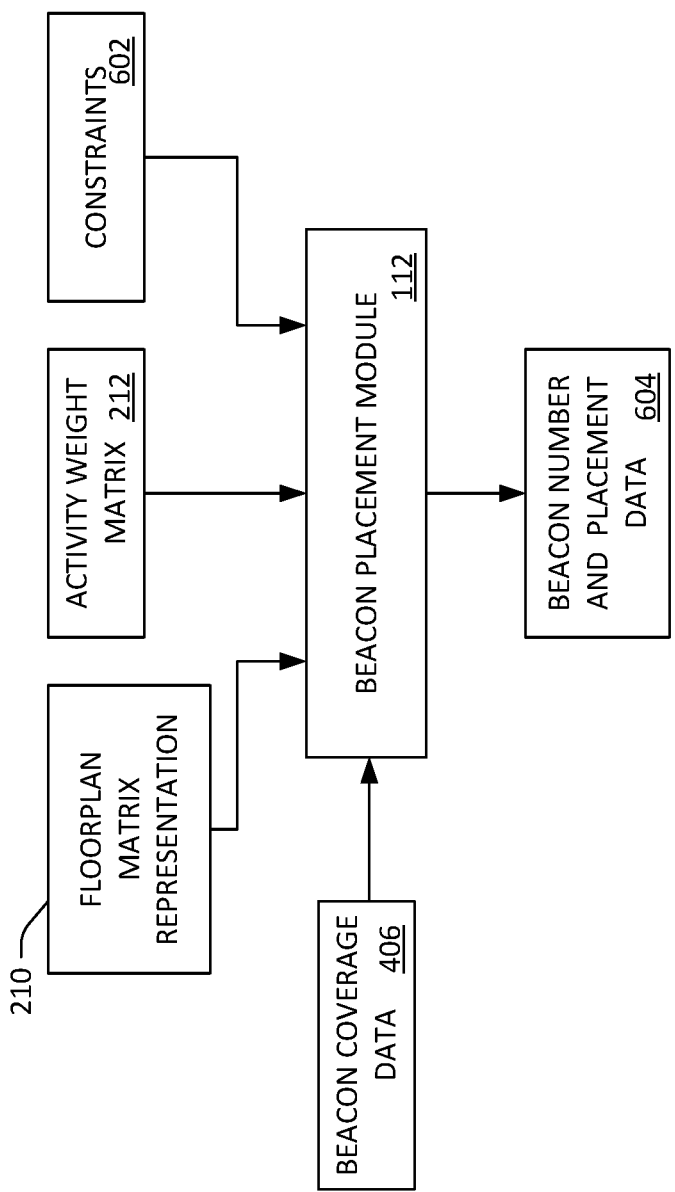
FIG. 6 is a functional block diagram of an exemplary beacon placement module that is configured to identify positions where wireless beacons are to be placed within a building.

With reference now to FIG. 6, a functional block diagram illustrating exemplary operation of the beacon placement module 112 is illustrated. The beacon placement module 112 is configured to receive the floorplan matrix representation 210 output by the floorplan representation generator module 108, the activity weight matrix 212 output by the floorplan representation generator module 108, and constraints 602, wherein the constraints 602, for example, can identify a maximum number and/or minimum number of wireless beacons that are to be installed in the building, can identify a position within the building where a wireless beacon must be placed, etc. In another example, the constraints 602 may identify one or more areas of the building where optimal coverage is desired. The beacon placement module 112 can further receive the beacon coverage data 406 output by the coverage simulator module 110, where the beacon coverage data 406 corresponds to a certain number of wireless beacons located at proposed positions that were subjected to simulation.

The beacon placement module 112 can iteratively receive the beacon coverage data 406 for different numbers and placements of wireless beacons within the building from the coverage simulator module 110 and can compute a value for loss for each proposed number and placement of the wireless beacons that were simulated. The beacon placement module 112 is configured to attempt to minimize the value for loss and output beacon number and placement data 604 that corresponds to an approximated minimized value for loss. For example, the beacon placement module 112 can execute a multi-objectives loss function that considers several different sources of loss, and the beacon placement module 112 can attempt to minimize the value for loss when identifying number and placement of wireless beacons to deploy within the building. Because it is computationally difficult to identify a true minimum for the value for loss, such minimum can be approximated by identifying a local minimum value, by selecting a value for loss that is below a predefined threshold as the minimum, and/or by selecting a lowest computed value for loss as the minimum after some number of iterations.

With more specificity, given the representation matrix R with element $r_{ij} \in \{0, 1, 2\}$ and area activity A, $R_b$ can denote the "block" area collection $\{r_{ij} \in R | r_{ij}=0\}$, $R_a$ can denote the "accessible" area collection $\{r_{ij} \in R | r_{ij}=1\}$, and $R_d$ can denote the "deployable" area collection $\{r_{ij} \in R | r_{ij}=2\}$. Additionally, a number of beacons can be denoted as C, with a cost of each beacon i being denoted as $c_i$, and a maximum budget for beacons denoted as $\alpha$. The beacon placement module 112 can: 1) select a number of beacons from C whose total budget is not greater than $\alpha$; and 2) identify the approximate optimal placement for the selected beacons. The beacon placement module 112 can unify these two tasks into one optimization setup by building $P=\{p_i | p_i \in R_d \cup \{null\}\}$ as all beacon placements, where null represents not being selected.

Thus, the beacon placement module 112 can solve the optimal beacon placement from the following optimization problem:

$$\min_P \; L(R, C, P, A) \qquad (2)$$

subject to $$\Sigma_i c_i \times \delta(p_i \neq null) \leq \alpha, \qquad (3)$$

where L is the objective loss function and $\delta(x)=1$ if x=true, else 0.

The multi-objectives loss function includes three contributions of loss: 1) overall signal coverage ($L_s$); 2) total cost ($L_c$); and 3) beacon distribution ($L_d$). Namely, the loss L computed by the beacon placement module 112 can be decomposed into:

$$L(R,C,P,A)=L_s(R,P,A)+\omega_c L_c(C,P)+\omega_d L_d(P), \qquad (4)$$

where $\omega_c$ and $\omega_d$ are normalized weights assigned to $L_c$ and $L_d$, respectively.

For received signal strength indication (RSSI) positioning, at least three wireless beacons with suitable signal strength are needed to estimate a location of a device with sufficient accuracy (e.g., within ½ meter). The beacon placement module 112 can identify a wireless beacon as being valid at observation point (x, y) if the RSSI of a wireless signal emitted by the wireless beacon is larger than some threshold (e.g., −80 dB). Therefore, more formally, the signal coverage loss $L_s$ can be given as:

$$L_s(R,P,A)=\Sigma_{r_{ij} \in R_a} A_{ij} \max\{0, 3-\Sigma_m \delta(S_R(p_m, r_{ij})) > -80\}, \qquad (5)$$

where $S_R$ provides signal strength simulation given representation R and depends on wireless beacon location $p_i$ and receiver location $r_{ij}$. $A_{ij}$ is the weight for each area represented in the activity weight matrix 212, reflecting area popularity. For instance, $A_{ij}=10$ for areas with a relatively high volume of traffic while $A_{ij}=1$ for areas with a relatively low volume of traffic.

The cost loss $L_c$ can be formalized as follows:

$$L_c(C,P)=\Sigma_i c_i \times \delta(p_i \neq null). \qquad (6)$$

Therefore, the cost loss increases linearly with the number of wireless beacons.

It has been ascertained that when the shape formed by connecting three wireless beacon locations is equal to an equilateral triangle, positioning error for receivers located where coverage of wireless signals emitted by the wireless beacons overlap is smallest. Conversely, when three wireless beacons are collinear or clustered, the positioning error for receivers located where coverage of wireless signals emitted by the wireless beacons overlap is largest. Accordingly, signal coverage alone is not sufficient to indicate indoor positioning accuracy; rather it is preferred that beacons be placed as far apart as possible while still providing overlapping coverage. To take such distribution into consideration, the beacon placement module 112 penalizes stacked or clustered wireless beacons by taking the distribution loss $L_d$ into consideration, where $L_d$ can be formalized as follows:

$$L_d(P)=\Sigma_i N(p_i, P) * \delta(p_i \neq null), \qquad (7)$$

where $N(p_i, P)$ is the number of weighted nearby wireless beacons, and can be expressed as:

$$N(p_i, P)=\Sigma_{d \; in \{2,4,6,8\}} \Sigma_{\{m|m \neq i\}} \delta(\|p_m - p_i\| \leq d). \qquad (8)$$

Therefore, for each placed wireless beacon, any other wireless beacon can be penalized with a first weight if the neighboring wireless beacon is within 2 meters of the wireless beacon, can be penalized with a second weight if the neighboring wireless beacon is within between 2 and 4 meters of the wireless beacon, can be penalized with a third weight if the neighboring wireless beacon is within between 4 and 6 meters of the wireless beacon, and can be penalized with a fourth weight if the neighboring wireless beacon is within between 6 meters and 8 meters of the wireless beacon. In an alternative embodiment, instead of the step-wise approach described above, a weight can linearly increase as distance between the wireless beacon and the neighboring wireless beacon decreases. Other examples are also contemplated. It can be ascertained that there is a trade-off between $L_s$ and $L_d$. $L_s$ pulls wireless beacons together to obtain a larger intersection area while $L_d$ pushes wireless beacons apart as wireless beacons become nearer to each other.

As indicated previously, the beacon placement module 112 can iteratively compute values for loss L for different proposed positions of wireless beacons within the building (and with different proposed numbers of wireless beacons within the building). Because there are multiple and competing objectives considered by the beacon placement module 112, identifying combinations of $L_s$, $L_c$, and $L_d$ that result in minimization of the value for loss L is NP hard. To allow for computation of an approximation of the minimized value for loss, the beacon placement module 112, in an example, can utilize an evolutionary algorithm in connection with outputting the beacon number and placement data 604.

An evolutionary algorithm is a subset of evolutionary computation whose mechanism is inspired by biological evolution. An evolutionary algorithm optimizes objectives by evaluating, generating, and selecting from generation to generation. Each generation (proposed wireless beacon positions and number of wireless beacons) includes a population that comprises many candidate solutions to the optimization problem, where the candidate solutions are referred to as "individuals". The objectives are evaluated for every individual, and an output value for an individual is referred to as "fitness". A population for a new generation is generated through crossover and mutation operations. In a new generation, individuals with lowest fitness in the population are replaced with the new individuals. For instance, each individual can be a single beacon placement proposal P and a population may include many individuals (beacon placement proposals). Fitness is the value of each beacon placement proposal that is calculated from the loss function described above. Mutation refers to moving a wireless beacon from one position in the building to another position in the building, and crossover refers to exchanging some wireless beacon positions between two individuals (between two wireless beacon placement proposals). New beacon placement proposals created from mutation and crossover are referred to as offspring. In addition, evolutionary algorithms can evaluate a whole population in a single iteration of the algorithm, so that it is possible to find several members with equal fitness in a single execution (which is more suitable for the multi-objective optimization). In an example, the beacon placement module 112 can employ the $\mu+\lambda$ algorithm as a selection algorithm.

With respect to such algorithm, $\mu$ is a size of a new population during each iteration and $\lambda$ determines how many offspring will be generated from crossover or mutation. First, individuals with an invalid fitness are evaluated. Second, the evolutionary loop begins by producing $\lambda$ offspring from the population through crossover or mutation. Finally, the offspring are evaluated and the next-generation population of size $\mu$ is selected from both the offspring and current population.

In summary then, the beacon placement system 106 is configured to perform the following acts: 1) the beacon placement system 106 receives or constructs a computer-implemented floorplan representation of a building where wireless beacons are to be installed and deployed; 2) based upon the computer-implemented floorplan representation, the beacon placement system 106 simulates coverages of wireless signals emitted by wireless beacons, wherein when the simulation is performed the wireless beacons are assigned to proposed positions within the building; 3) the beacon placement system 106 employs a multi-objectives loss function to compute a value for loss, where the multiple objectives include at least one of signal coverage loss, wireless beacon cost loss, or distribution loss; 4) the beacon placement module 112 computes this value for loss for several different proposed number and positions of wireless beacons within the building and selects the proposed number and positions of wireless beacons that correspond to the (approximated) minimized value for loss. Such number and positions of wireless beacons within the building can be provided to an installer for installing the identified number of wireless beacons at the identified positions within the building.

Figure 7:
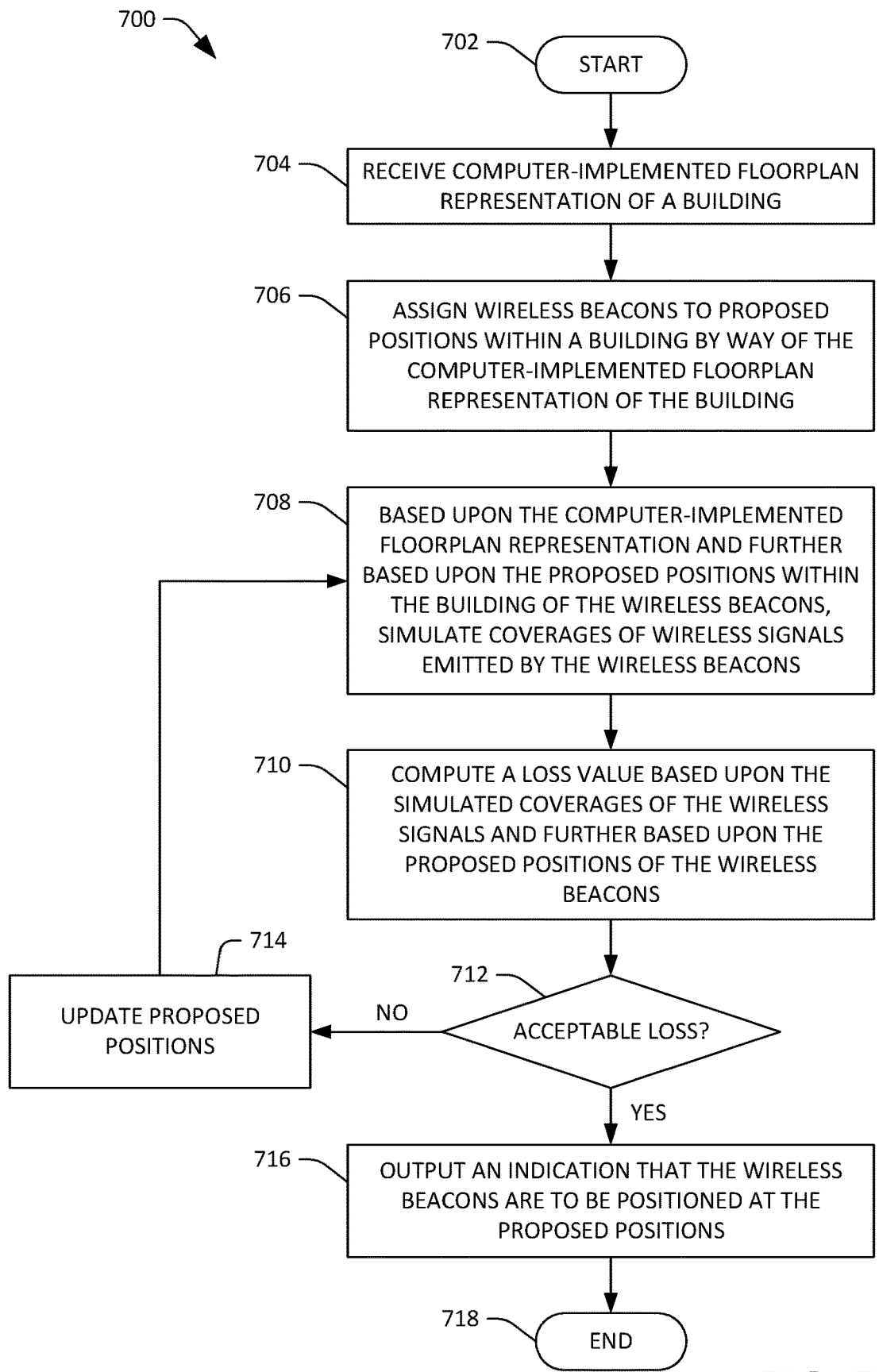
FIG. 7 is a flow diagram illustrating an exemplary methodology for assigning wireless beacons to positions within a building.
Figure 8:
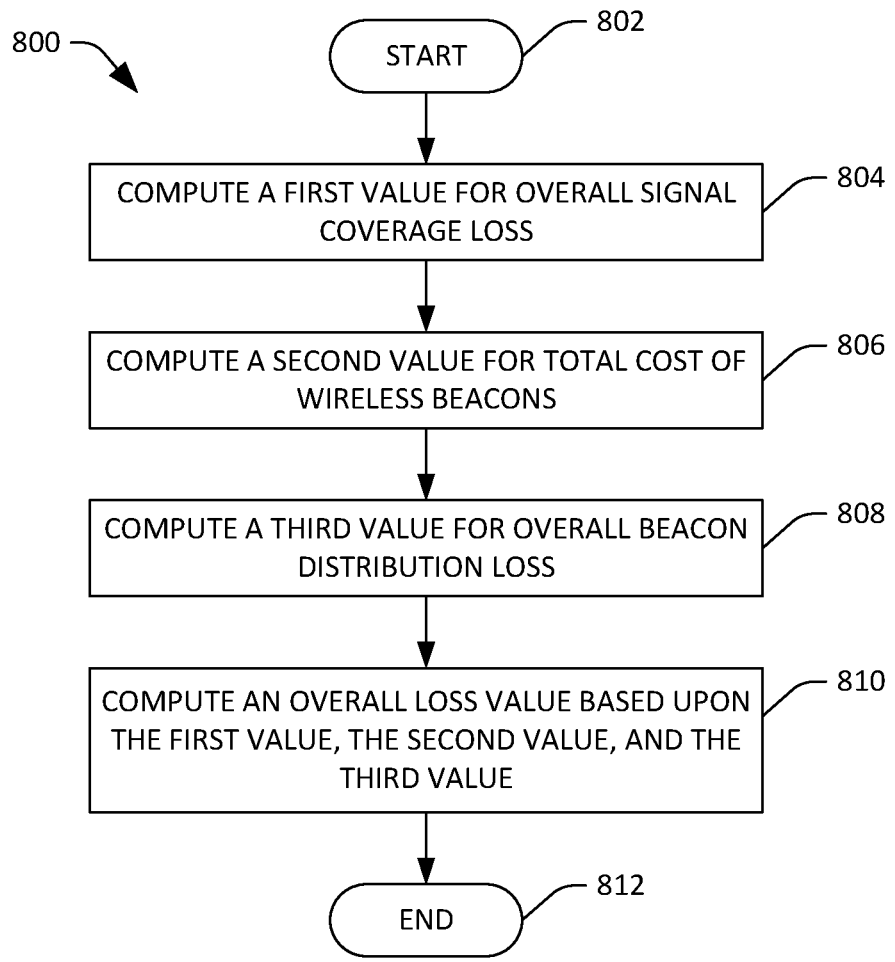
FIG. 8 is a flow diagram illustrating an exemplary methodology for computing a loss value.

FIGS. 7 and 8 illustrate exemplary methodologies relating to identifying positions in a building where wireless beacons are to be installed and deployed are illustrated. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to solely to FIG. 7, an exemplary methodology 700 for identifying positions where wireless beacons are to be installed within a building is illustrated. The methodology 700 starts at 702, and at 704 a computer-implemented floorplan representation of the building is received. At 706, wireless beacons are assigned to proposed positions within the building by way of the computer-implemented floorplan representation of the building. For example, initially the proposed positions can be randomly selected from amongst positions within the building where the wireless beacons are deployable.

At 708, based upon the computer-implemented floorplan representation and further based upon the proposed positions within the building of the wireless beacons, coverages of wireless signals emitted by the wireless beacons are simulated. As described previously, the simulation takes into consideration layout of the building and materials of building structures.

At 710, a loss value for the proposed positions is computed, wherein the loss value is computed based upon the simulated coverages of the wireless signals and further based upon the proposed positions of the wireless beacons within the building. At 712, a determination is made as to whether the loss value is acceptable; for example, the determination can be whether whether a difference between consecutively computed loss values is less than a threshold, whether the loss value is a lowest loss value out of some suitable number of computed loss values, etc. If at 712 it is determined that the loss value is not acceptable, then the methodology 700 proceeds to 714 where the proposed positions are updated, and thereafter the methodology returns to 708. When at 712 it is ascertained that the loss value is acceptable, then at 716 an indication is output that the wireless beacons are to be positioned at the proposed positions within the building that correspond to the acceptable loss value. The methodology 700 completes at 718.

Now referring to FIG. 8, a methodology 800 that facilitates computing a loss value for proposed positions of wireless beacons within a building is illustrated. The methodology 800 starts at 802, and at 804 a first value is computed for signal coverage loss. At 806, a second value is computed for cost loss of wireless beacons. At 808 a third value is computed for beacon distribution loss, and at 810 an overall loss value is computed based upon the first value computed at 804, the second value computed at 806, and the third value computed at 808. The methodology 800 completes at 812.

Examples

In the examples set forth below, operation of the beacon placement system 106 as described with respect to three different case studies. First, operation of the beacon placement system 106 is presented with a relatively simple setup of a building. Thereafter, operation of the beacon placement system 106 with respect to selecting a number of wireless beacons is described. Finally, global and local wireless beacon placements in the context of realistic applications are presented. While the examples set forth below refer to two-dimensional scenarios, the beacon placement system 106 is configured to assign positions to wireless beacons in three dimensions.

Figure 9:
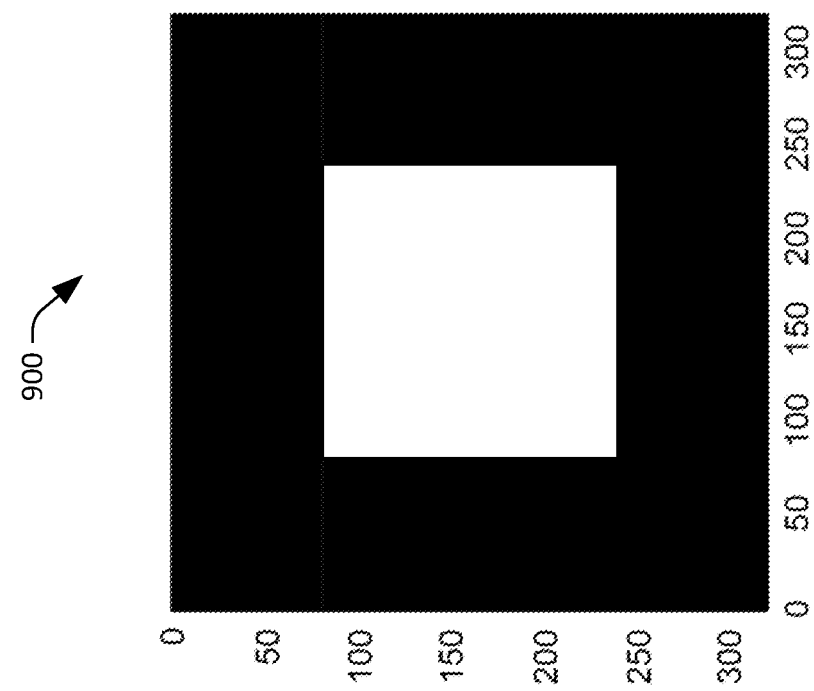
FIG. 9 is a schematic that depicts an exemplary experimental building layout.

A relatively simple setup 900 with a square shaped open space surrounded by infinite inaccessible block is presented in FIG. 9. In such experiment, the accessible area is treated as a deployable area. White represents accessible area where wireless beacons can be deployed and evaluated and black represents a block area where wireless beacons cannot be deployed. In an example, size of the accessible area is 16×16 meters.

Two experiments were conducted: a first with three wireless beacons and a second with four wireless beacons. The Friis model was employed to simulate coverage of wireless signals emitted by the wireless beacons and zero gains were assumed for both transmitter and receiver, with the transmitter default broadcasting power being −25 dB. Therefore, the beacon signal strength $S_R$ at receiver point r for a wireless beacon at position p is given as follows:

$$S_R(p, r) = -20 + 20 \times \log_{10}\left(\frac{\lambda}{4\pi\|p - r\|}\right), \quad (9)$$

where $\lambda$ is the Bluetooth wavelength (usually 0.125 meters). As indicated above, beacon signal strength is to be larger than −80 dB for indoor positioning applications. Hence, the effective coverage radius for each wireless beacon is 8 meters. In the following example, the beacon placement module 112 considers both signal coverage and beacon distribution as objectives.

Figure 10:
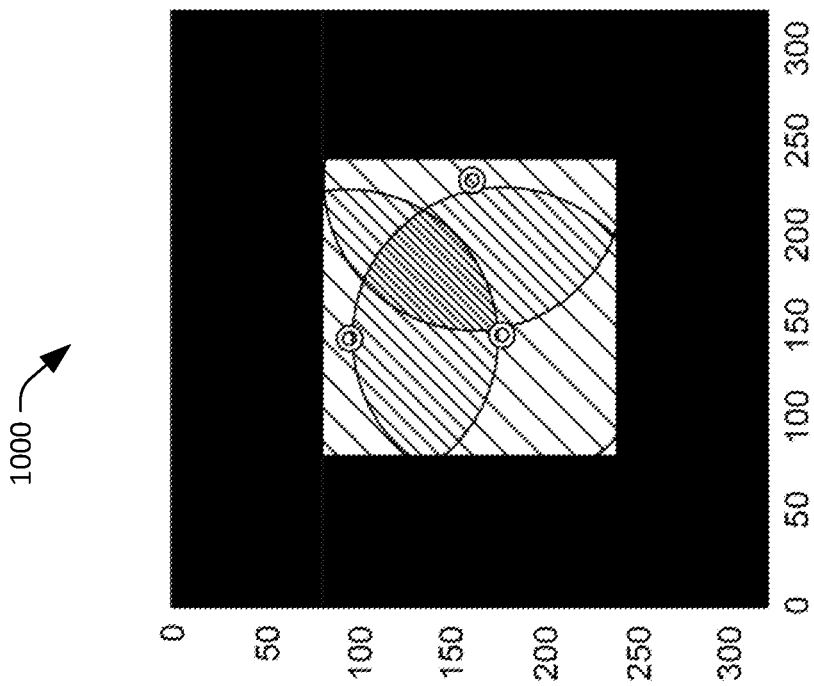
FIG. 10 is a schematic that depicts exemplary positioning of three wireless beacons within the exemplary building layout illustrated in FIG. 9.
Figure 11:
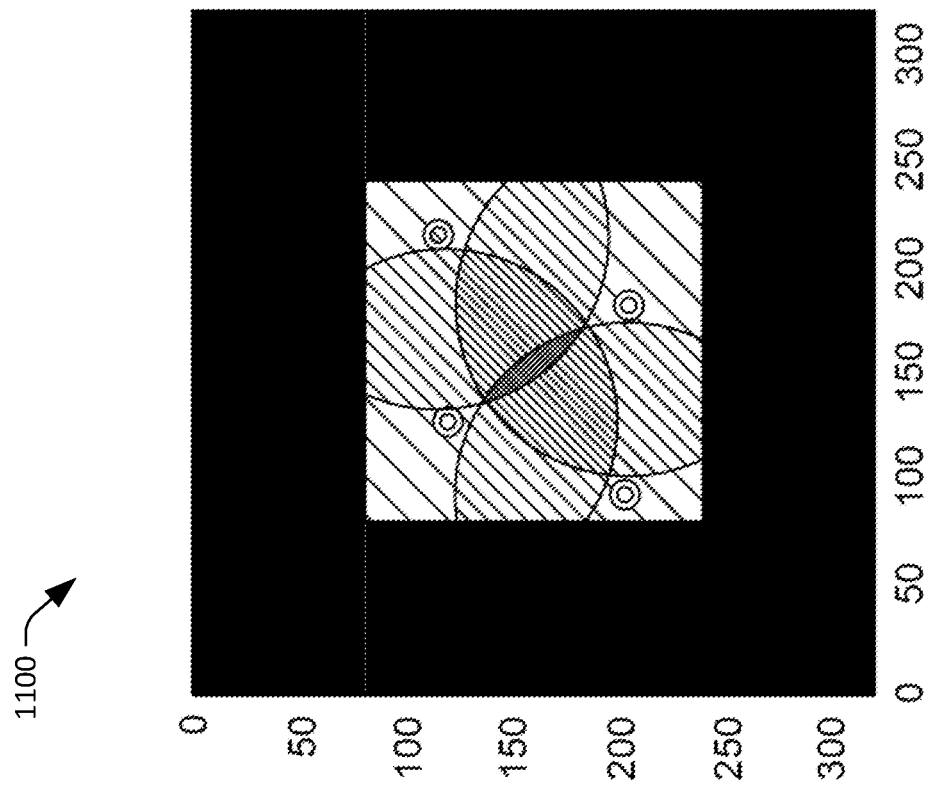
FIG. 11 is a schematic that depicts exemplary positioning of four wireless beacons within the exemplary building layout illustrated in FIG. 9.

FIGS. 10 and 11 depict beacon placements 1000 and 1100, respectively, output by the beacon placement system 106 as well as coverages for when the area includes three and four wireless beacons. As noted above, the black background represents a block area, the white square represents an accessible area, and small circles represent beacon positions within the accessible area. Coverages of wireless signals emitted by the wireless beacons are depicted, where a darker area represents intersections among coverages of wireless signals emitted by the wireless beacons (where it is desirable to maximize the area where coverages of the three wireless beacons overlap). It can be ascertained that the beacon placement system 106 provides near optimal lattice pattern placements. For example, in the three-beacon case represented in FIG. 10, the beacon positions form an equilateral triangle. It can be ascertained that if the beacon placement module 112 failed to consider distribution loss in the three wireless beacon case, the three wireless beacons would be stacked one on top of another to maximize the intersection area. However, this would be ill-suited for use in an indoor positioning application.

Figure 12:
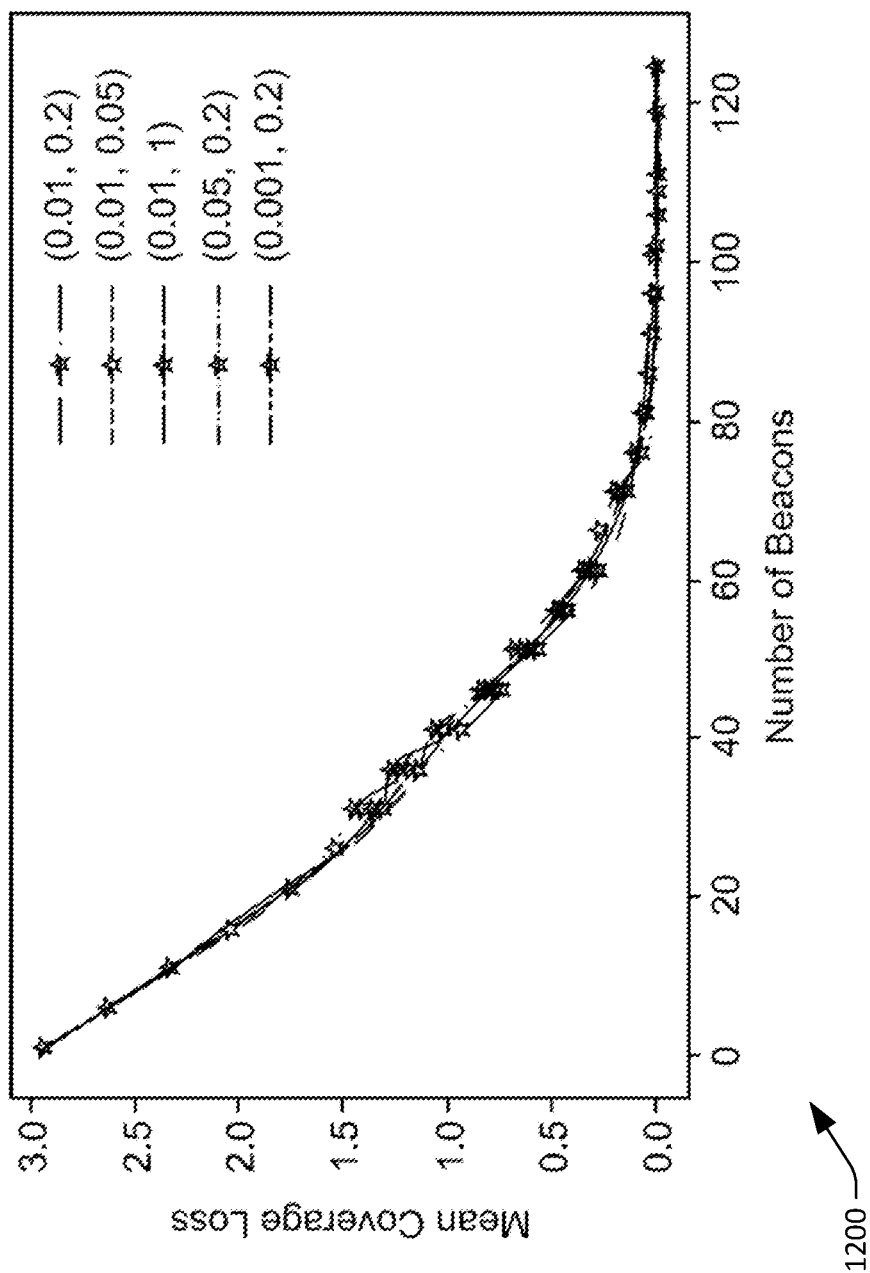
FIG. 12 is a plot that depicts a relationship between signal coverage loss and a number of wireless beacons.

Choosing a number of wireless beacons to be deployed in a target space while achieving balance between budget and signal coverage is a consideration when deploying an indoor positioning system in the real world. In the example set forth below, appropriate numbers of wireless beacons given different loss weights we and $\omega_d$ are presented. It can be assumed that each beacon costs some threshold amount (e.g., one dollar). FIG. 12 depicts a plot 1200 that illustrates relations between a number of wireless beacons and contribution of signal coverage loss $L_s$ to the value for loss L, where signal coverage loss decreases as a number of wireless beacons to be deployed increases (regardless of weights assigned to $\omega_c$ and $\omega_d$).

Figure 13:
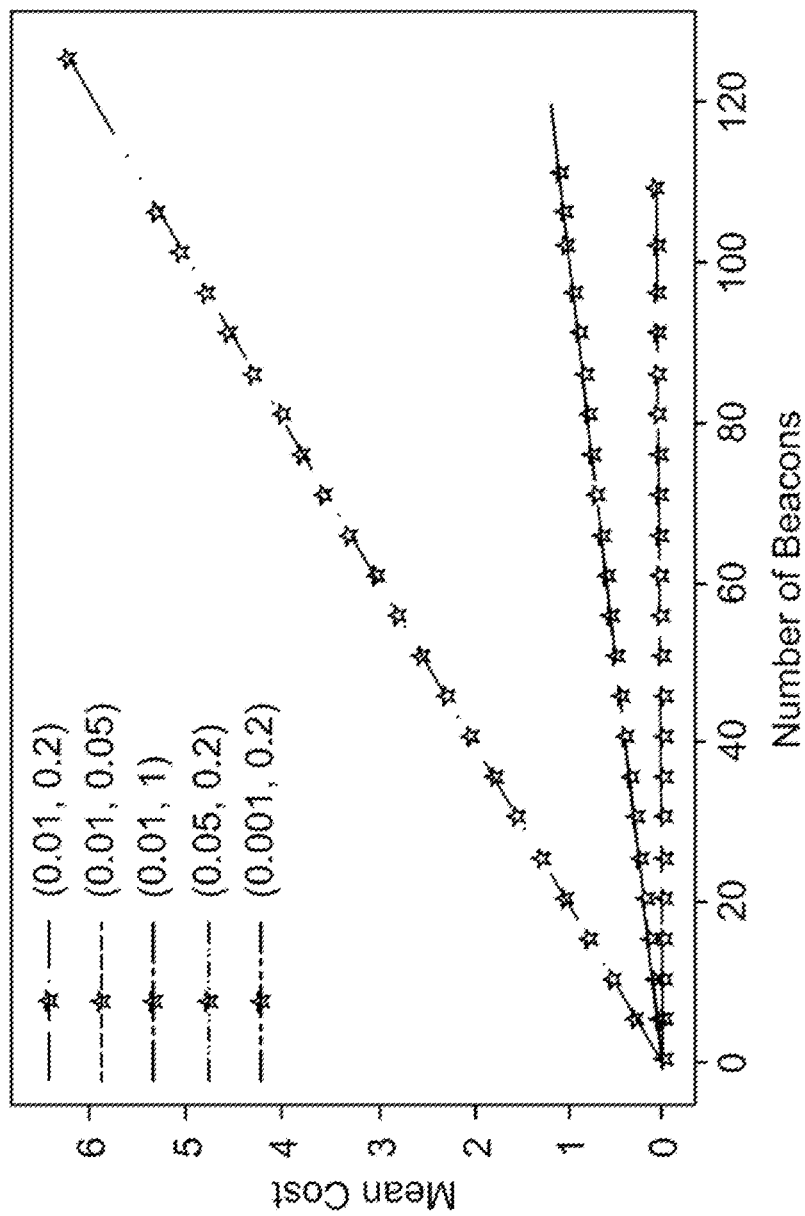
FIG. 13 is a plot that depicts a relationship between beacon cost loss and a number of wireless beacons.
Figure 14:
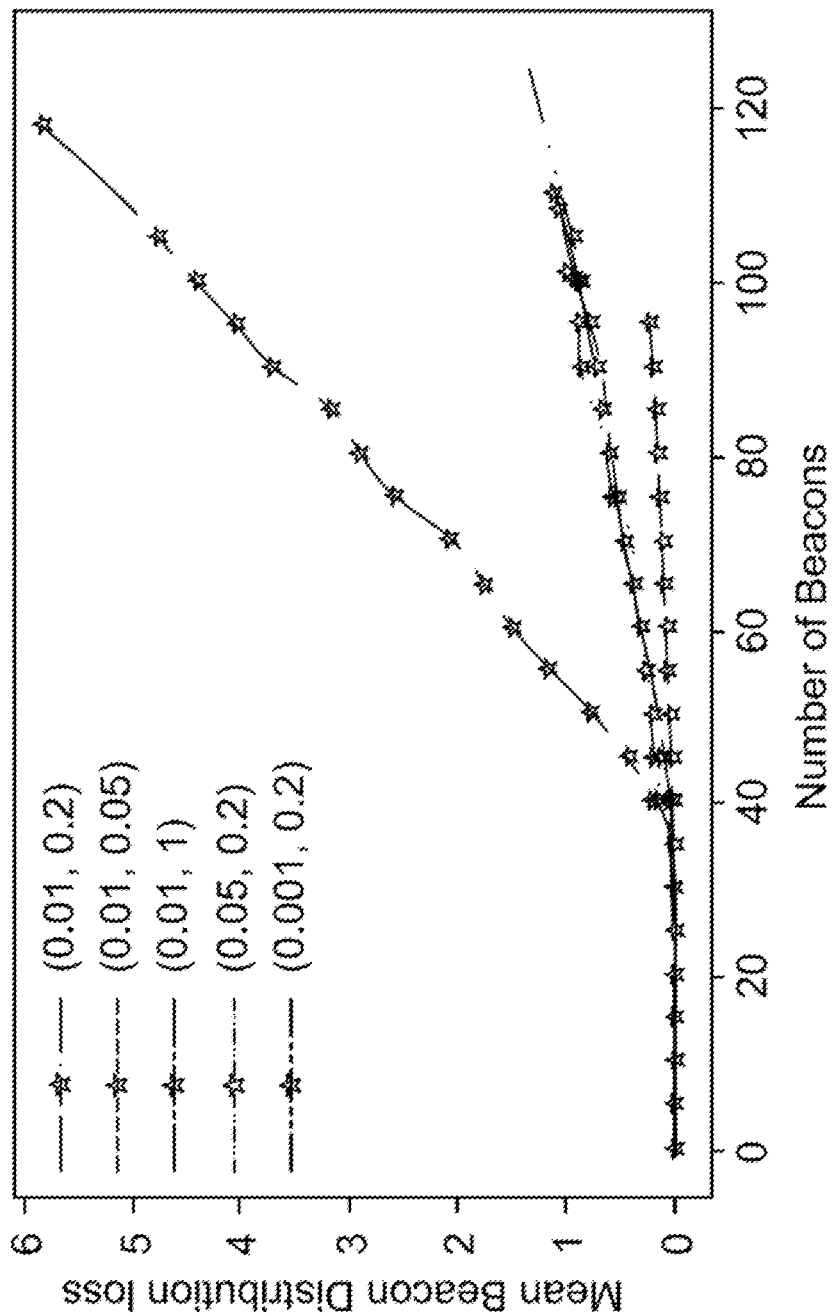
FIG. 14 is a plot that depicts a relationship between distribution loss and a number of wireless beacons.

FIG. 13 illustrates a plot 1300 that presents a relationship between cost loss $L_c$ and number of wireless beacons, where the cost loss increases linearly (with a slope that is defined by $\omega_c$) with the number of beacons. FIG. 14 includes a plot 1400 that illustrates a relationship between distribution loss $L_d$ and the number of wireless beacons, where the distribution loss increases as the number of wireless beacons increases, with the distribution loss further increasing as $\omega_d$ increases.

Figure 15:
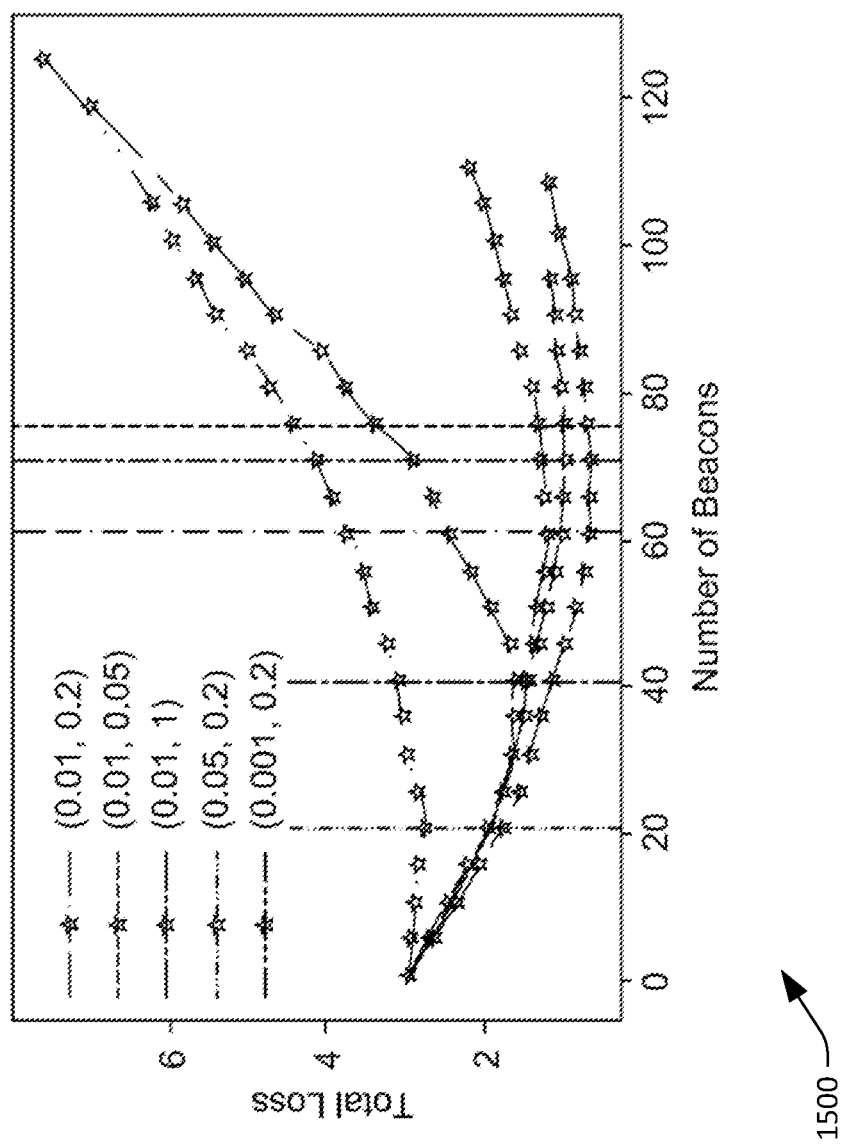
FIG. 15 is a plot that depicts a relationship between a value for loss and a number of wireless beacons.

FIG. 15 depicts a plot 1500 that illustrates a relationship between the value for loss L and the number of wireless beacons, where the signal coverage loss $L_s$, the cost loss $L_c$, and the distribution loss $L_d$ are accounted for. Total loss first decreases as the number of wireless beacons grows but then begins to ramp upwards. The appropriate number of wireless beacons to be deployed in the indoor positioning system should be the number that is at the minimum of the total loss L. With different values for $\omega_c$ and $\omega_d$, the proper beacon number varies. For instance, an end user can assign a higher value for $\omega_c$, such as 0.05, if the end user prefers lower cost (in which case the optimal beacon number would be, in this example, 40). On the other hand, an end user may choose to increase the budget for more beacons and thus obtain better signal coverage such is the case when $\omega_c$=0.001. In this example, a constraint set forth by the end user may require that a suitable beacon placement plan must have more than 95% of the area covered with at least two wireless beacons and more than 80% of the area covered with at least three wireless beacons. Hence, ($\omega_c$=0.01, $\omega_d$=0.2) can be set as weights with the corresponding number of wireless beacons to include in the indoor positioning system being 60.

Figure 16:
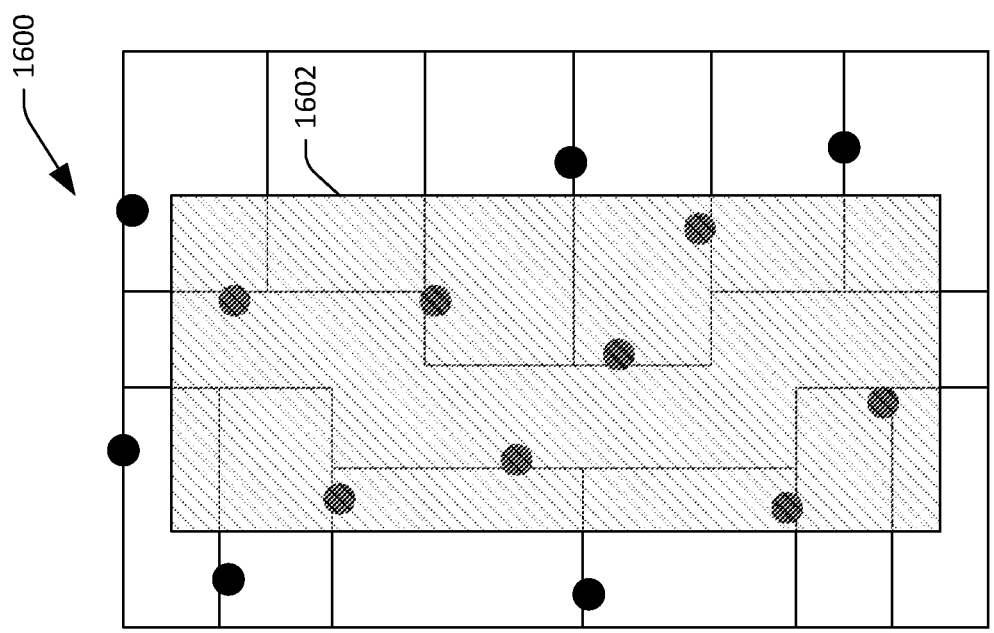
FIG. 16 is a schematic that depicts exemplary positioning of wireless beacons in a building based upon a weighted activity matrix.

FIG. 16 is schematic of a building layout 1600 that depicts wireless beacon placement when area activity is considered. As indicated above, area activity is represented as the activity weight matrix A that is provided to the beacon placement module 112. Thus, one area of a building may be more occupied than another as illustrated in the layout 1600, where a shaded area 1602 represents an area of the building that is typically more highly occupied than the area of the building represented by non-shaded areas. Weighting the beacon placement by activity can change the locations output by the beacon placement system 106 for the wireless beacons. As depicted in FIG. 16, locations for wireless beacons output by the beacon placement system 106 are configured to provide optimal coverage in the shaded area 1602 (area identified as having high activity) while sacrificing coverage in the non-shaded area.

Figure 17:
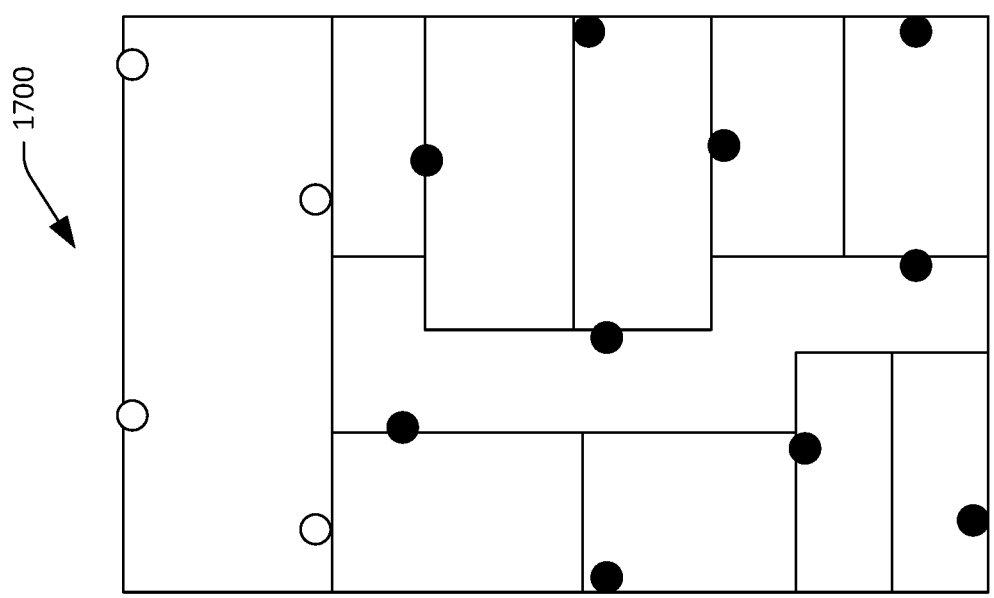
FIG. 17 is a schematic that depicts exemplary repositioning of wireless beacons based upon a change in layout of a building.

FIG. 17 is a schematic that illustrates another exemplary building layout 1700, where the building layout 1700 includes an alteration to the building layout 114 depicted in FIG. 1. Therefore, referring concurrently to FIGS. 1 and 17, it can be ascertained that a building layout may alter over time. When a portion of a building layout is altered, however, it may not make sense to entirely redeploy wireless beacons within the building; rather, it may be desirable only to redeploy wireless beacons within the area that has been subject to change. For instance, comparing FIG. 1 to FIG. 17, in FIG. 17 a conference room has been constructed at the end of a corridor, where the conference room replaces four offices. Locations of four wireless beacons that were positioned within the four different offices can be altered by the beacon placement system 106 based upon a change in the building layout. For instance, the beacon placement system 106 can be provided with a local layout as well as a number of wireless beacons that are to be positioned in room(s) included in the local layout. The beacon placement system 106 can then output positions for the wireless beacons within the identified local layout.

Figure 18:
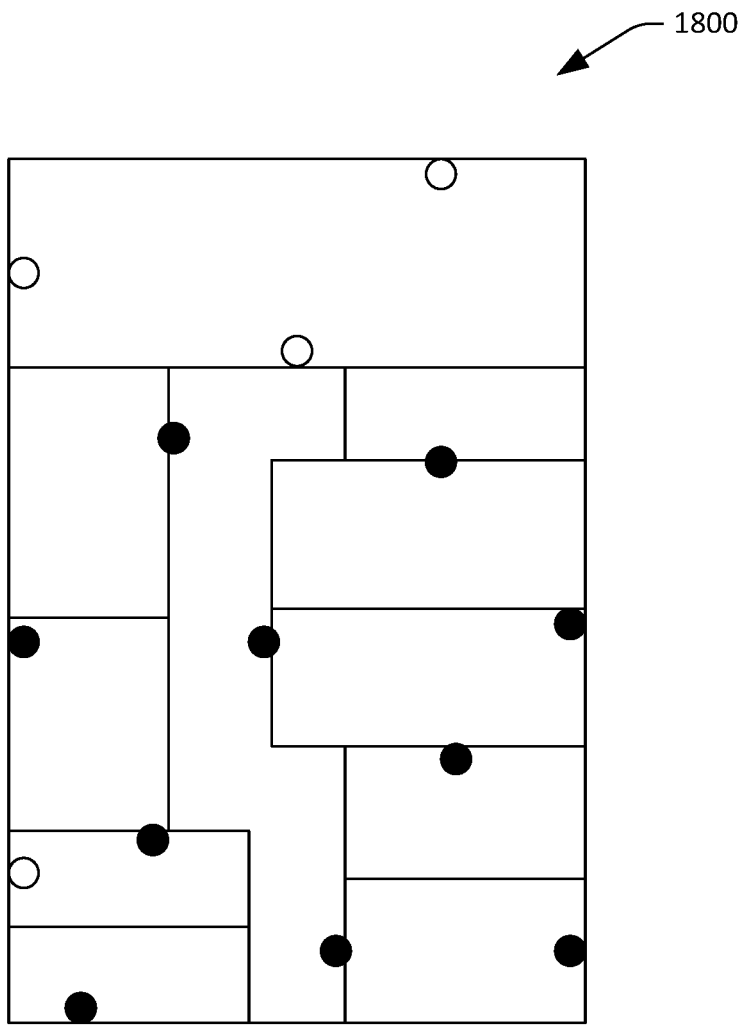
FIG. 18 is a schematic that depicts exemplary repositioning of wireless beacons based upon a change in layout of a building.

In another example, all wireless beacons that are outside of the newly renovated area can be constrained as being fixed at their current positions, while wireless beacons that were previously positioned within the newly renovated area are free to be placed anywhere within the building. Referring to FIG. 18, the four white circles in the exemplary building layout 1800 represent wireless beacons that were placed in the four offices at the top of the building layout 114 referenced in FIG. 1. The beacon placement system 106 can treat these wireless beacons as being movable while identifying the other wireless beacons (those represented as black circles) as having a constrained position. For instance, it may be undesirable to move any of the wireless beacons that were not within the four offices. However, any of the wireless beacons that were in the four offices can be positioned anywhere in the building in connection with minimizing loss (since renovation on those offices is being undertaken and the wireless beacons are likely to be moved anyway). An exemplary updated building layout is provided to the beacon placement system 106, which can identify optimal locations for the wireless beacons that were previously located in the four offices at the top of the layout 114 represented in FIG. 1. The result illustrated in FIG. 18 is that three wireless beacons out of the four are placed within the larger conference room while a fourth wireless beacon is placed somewhere else in the building to optimize overall coverage (and minimize loss).

Figure 19:
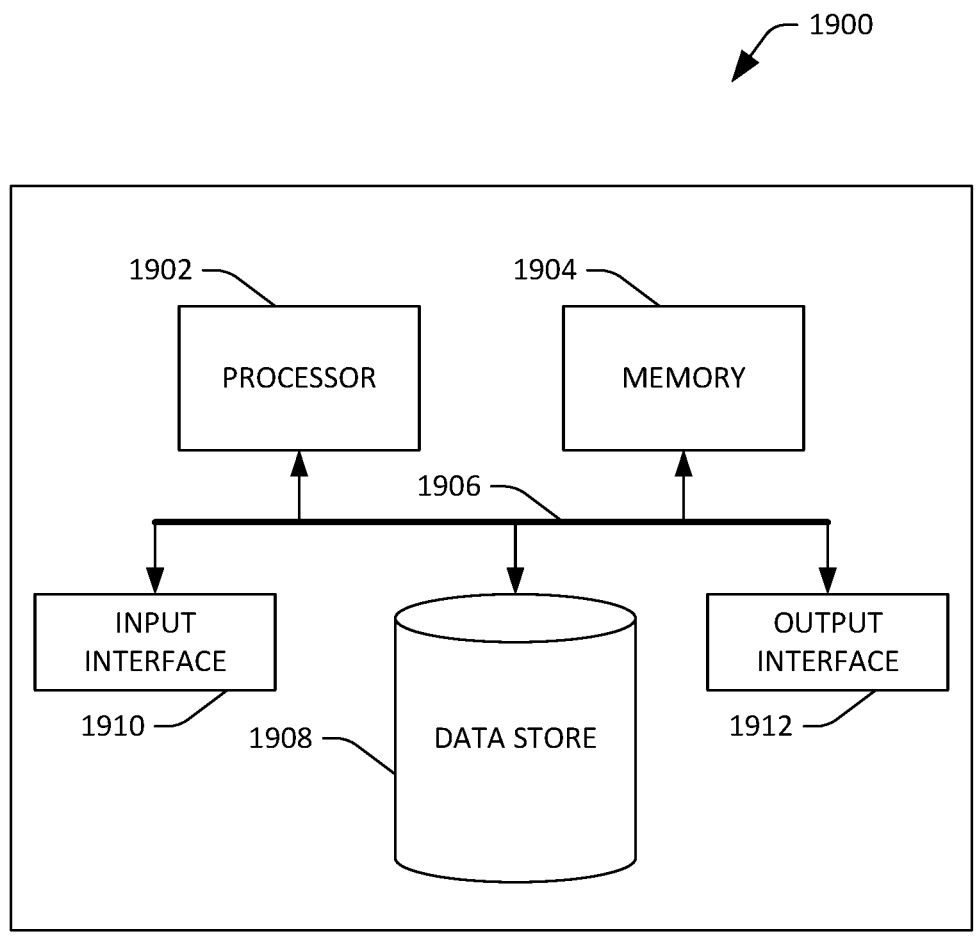
FIG. 19 is an exemplary computing system.

Referring now to FIG. 19, a high-level illustration of an exemplary computing device 1900 that can be used in accordance with the systems and methodologies disclosed herein is illustrated. For instance, the computing device 1900 may be used in a system that is configured to identify positions of wireless beacons that are to be deployed in an indoor positioning system. By way of another example, the computing device 1900 can be used in a system that is configured to set forth constraints to the beacon placement system 106. The computing device 1900 includes at least one processor 1902 that executes instructions that are stored in memory 1904. The instructions may be, for instance, instructions for implementing functionality described as being carried out by one or more components discussed above or instructions for implementing one or more of the methods described above. The processor 1902 may access the memory 1904 by way of a system bus 1906. In addition to storing executable instructions, the memory 1904 may also store loss values, floorplan representations, and so forth.

The computing device 1900 additionally includes a data store 1908 that is accessible by the processor 1902 by way of the system bus 1906. The data store 1908 may include executable instructions, floorplan representations, activity matrices, etc. The computing device 1900 also includes an input interface 1910 that allows external devices to communicate with the computing device 1900. For instance, the input interface 1910 may be used to receive instructions from an external computer device, from a user, etc. The computing device 1900 also includes an output interface 1912 that interfaces the computing device 1900 with one or more external devices. For example, the computing device 1900 may display text, images, etc. by way of the output interface 1912.

It is contemplated that the external devices that communicate with the computing device 1900 via the input interface 1910 and the output interface 1912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1900 may be a distributed system. Thus, for instance, several devices may be in communication by way of a network connection and may collectively perform tasks described as being performed by the computing device 1900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of a computer-readable storage medium. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to identify positions within a building where wireless beacons that emit wireless signals are to be positioned, the computing system comprising:
    a processor; and
    memory storing instructions that, when executed by the processor, cause the processor to perform acts comprising:
        receiving a computer-implemented floorplan representation of the building;
        based upon the computer-implemented floorplan representation, simulating coverages of wireless signals emitted by the wireless beacons when the wireless beacons are assigned to proposed positions within the building;
        using a multi-objectives loss function to compute values for loss, wherein the multi-objectives loss function computes the values for loss based upon the simulated coverages of the wireless signals; and
        based upon the values for loss, simultaneously identifying a number of wireless beacons to install in the building and positions within the building where the wireless beacons are to be positioned.

2. The computing system of claim 1, where using the multi-objectives loss function to compute the values for loss comprises:
    assigning a first wireless beacon to a first proposed position in the computer-implemented floorplan representation; and
    assigning a second wireless beacon to a second proposed position in the computer-implemented floorplan representation, wherein the multi-objectives loss function computes a value for loss in the values for loss based upon a distance between the first proposed position and the second proposed position.

3. The computing system of claim 1, the acts further comprising:
    assigning a cost to each wireless beacon in the wireless beacons, wherein the multi-objectives loss function computes the values for loss based upon the cost assigned to each of the wireless beacons.

4. The computing system of claim 1, the acts further comprising:
    assigning values to the proposed positions, wherein the values are indicative of numbers of people who will pass the proposed positions during a window of time, and further wherein the multi-objectives loss function computes the values for loss based upon the values assigned to the proposed positions.

5. The computing system of claim 1, wherein a first wireless beacon is assigned to a first proposed position in the computer-implemented floorplan representation, where
    a second wireless beacon is assigned to a second proposed position in the computer-implemented floorplan representation, the acts further comprising:
    assigning a cost to the first wireless beacon;
    assigning a value to the first proposed position, wherein the value is indicative of a number of people who will pass the first proposed position within the building during a window of time, and further wherein the multi-objectives loss function computes a value for loss in the values for loss based upon:
        a distance between the first proposed position and the second proposed position;
        the cost assigned to the first wireless beacon; and
        the value assigned to the first proposed position.

6. The computing system of claim 1, wherein the coverages of the wireless signals emitted by the wireless beacons are based upon representations of walls in the computer-implemented floorplan representation.

7. The computing system of claim 6, wherein the coverage of the wireless signals emitted by the wireless beacons are additionally based upon materials of the building identified in the computer-implemented floorplan representation.

8. The computing system of claim 1, wherein the proposed positions in the computer-implemented floorplan representation are identified as the positions within the building where the wireless beacons are to be positioned due to the wireless beacons being included in an indoor positioning system.

9. The computing system of claim 1, the acts further comprising:
    receiving an identity of a maximum number of wireless beacons that are to be positioned within the building, wherein the multi-objectives loss function computes the values for loss based upon the maximum number of wireless beacons that are to be positioned within the building.

10. The computing system of claim 1, the acts further comprising:
prior to identifying the proposed positions in the building as the positions within the building where the wireless beacons are to be positioned:
assigning a wireless beacon to a first proposed position;
based upon the computer-implemented floorplan representation, simulating first coverage of a first wireless signal emitted by the wireless beacon when the wireless beacon is assigned to the first proposed position within the building;
using the multi-objectives loss function to compute a first value for loss, wherein the multi-objectives loss function computes the first value for loss based upon the simulated first coverage of the wireless signal;
assigning the wireless beacon to a second proposed position, wherein the second proposed position is different from the first proposed position;
based upon the computer-implemented floorplan representation, simulating second coverage of a second wireless signal emitted by the wireless beacon when the wireless beacon is assigned to the second proposed position within the building;
using the multi-objectives loss function to compute a second value for loss, wherein the multi-objectives loss function computes the second value for loss based upon the simulated second coverage of the second wireless signal;
and
comparing the first value for loss with the second value for loss, wherein the first proposed position is identified as the position within the building where the first wireless beacon is to be positioned based upon the first value for loss being lower than the second value for loss.

11. The computing system of claim 10, wherein an evolutionary algorithm is employed to assign the first wireless beacon to the second proposed position and subsequently assign the wireless beacon to the first proposed position.

12. A method for assigning wireless beacons to positions within a building, the method comprising:
receiving a computer-implemented floorplan representation of the building;
assigning the wireless beacons to proposed positions within the building by way of the computer-implemented floorplan representation of the building;
based upon the computer-implemented floorplan representation of the building and further based upon the proposed positions within the building of the wireless beacons, simulating coverages of the wireless beacons when the wireless beacons are positioned at the proposed positions;
computing loss values based upon the simulated coverages of the wireless beacons and further based upon the proposed positions for the wireless beacons, wherein the loss values increase as distances between a subset of wireless beacons in the wireless beacons decrease;
simultaneously identifying a number of wireless beacons and final positions of the wireless beacons based upon the computed loss values; and
outputting an indication that the identified number of wireless beacons are to be positioned at the final positions based upon the loss values.

13. The method of claim 12, wherein the wireless beacons are included in an indoor positioning system.

14. The method of claim 12, wherein the computer-implemented floor plan representation of the building identifies wall boundaries and further identifies materials included in the building.

15. The method of claim 12, wherein a loss value in the loss values is additionally based upon the number of wireless beacons.

16. The method of claim 15, wherein the loss value is additional based upon a cost assigned to each wireless beacon in the wireless beacons.

17. The method of claim 12, wherein the wireless beacons are configured to emit Bluetooth low energy signals.

18. The method of claim 12,
wherein the number of wireless beacons is identified due to the number of wireless beacons being less than a predefined threshold.

19. The method of claim 12, wherein a multi-objectives loss function is employed to compute the loss values.

20. A computer-readable storage medium comprising instructions that, when executed by a processor, cause the processor to perform acts comprising:
receiving a computer-implemented floorplan representation of a building;
based upon the computer-implemented floorplan representation, simultaneously identifying a number of wireless beacons to position in the building and positions of the wireless buildings in the buildings, where the number of wireless beacons and the positions of the wireless beacons are identified based upon:
simulated coverage of a wireless signal emitted by a wireless beacon when the wireless beacon is assigned to a proposed position within the building; and
a value for loss computed by way of a multi-objectives loss function, wherein the value for loss is computed based upon the simulated coverage of the wireless signal; and
outputting instructions to an installer, where the instructions identify the number of wireless beacons and the positions of the wireless beacons in the building where the number of wireless beacons are to be installed.

* * * * *